(12) United States Patent
Huang et al.

(10) Patent No.: US 10,663,300 B2
(45) Date of Patent: May 26, 2020

(54) UAV FLIGHT PATH GENERATING METHOD AND DEVICE

(71) Applicant: Shenzhen University, Shenzhen, Guangdong Province (CN)

(72) Inventors: Hui Huang, Shenzhen (CN); Ke Xie, Shenzhen (CN)

(73) Assignee: Shenzhen University, Shenzhen (CN)

(*) Notice: Subject to any disclaimer, the term of this patent is extended or adjusted under 35 U.S.C. 154(b) by 313 days.

(21) Appl. No.: 15/884,914

(22) Filed: Jan. 31, 2018

(65) Prior Publication Data
US 2019/0145778 A1 May 16, 2019

(30) Foreign Application Priority Data
Nov. 13, 2017 (CN) .......................... 2017 1 1111924

(51) Int. Cl.
| | | |
|---|---|---|
| *G01C 21/20* | (2006.01) | |
| *B64C 39/02* | (2006.01) | |
| *G05D 1/10* | (2006.01) | |
| *G06Q 10/04* | (2012.01) | |

(52) U.S. Cl.
CPC ............ *G01C 21/20* (2013.01); *B64C 39/024* (2013.01); *G05D 1/101* (2013.01); *G06Q 10/047* (2013.01); *B64C 2201/127* (2013.01)

(58) Field of Classification Search
CPC . G01C 21/20; B64C 39/024; B64C 2201/127; G05D 1/101; G06Q 10/047
USPC .......................................................... 701/3
See application file for complete search history.

(56) References Cited

U.S. PATENT DOCUMENTS

| | | | |
|---|---|---|---|
| 2017/0169713 A1* | 6/2017 | Gong | ...................... G06F 16/29 |
| 2018/0025650 A1* | 1/2018 | Taveira | ................. B64C 39/024 |
| | | | 701/3 |

OTHER PUBLICATIONS

Niels Joubert et al.; An interactive tool for designing quadrotor camera shots. ACM Trans. Graphics 34, 6, 238, 2015.
Mike Roberts et al.; Generating dynamically feasible trajectories for quadrotor cameras. ACM Transactions on Graphics (Proc. SIGGRAPH 2016) 35, 4.
Christoph Gebhardt et al.; Airways: Optimization-based planning of quadrotor trajectories according to high-level user goals. In Proc. 2016 CHI Conference on Human Factors in Computing Systems, ACM, New York, NY, USA, CHI '16, 2508-2519.

* cited by examiner

*Primary Examiner* — Tan Q Nguyen
(74) *Attorney, Agent, or Firm* — Harness, Dickey & Pierce, P.L.C.

(57) ABSTRACT

This invention proposes a new method and software to generate a path with good quality for aerial video shooting in large scale scenes. Using a coarse 2.5D model of a scene, this path generation method consists of several steps: first the user is expected to specify a set of landmarks and designate a superset of key-views for each landmark; our system then automatically generates and evaluates a variety of local camera moves for observing each landmark, which are smooth and collision-free; then automatically determines the optimal order in which the landmarks should be visited, chaining the local camera moves into a single continuous trajectory. Thus, users are able to focus on specifying the visual content that should be captured by the aerial video, rather than on the difficult lower level aspects of designing and specifying the precise drone and camera motions.

21 Claims, 9 Drawing Sheets

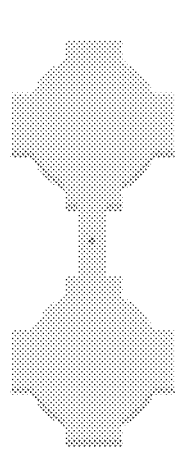 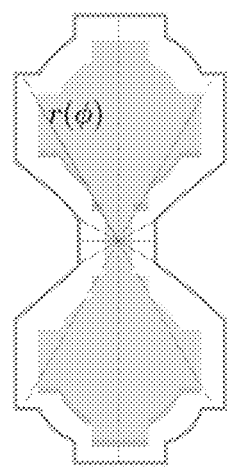 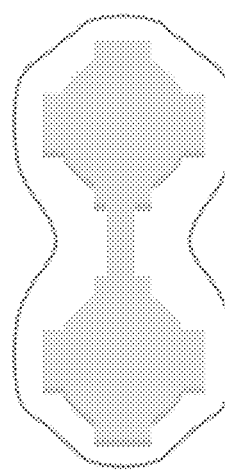
Figure 7A     Figure 7B     Figure 7C
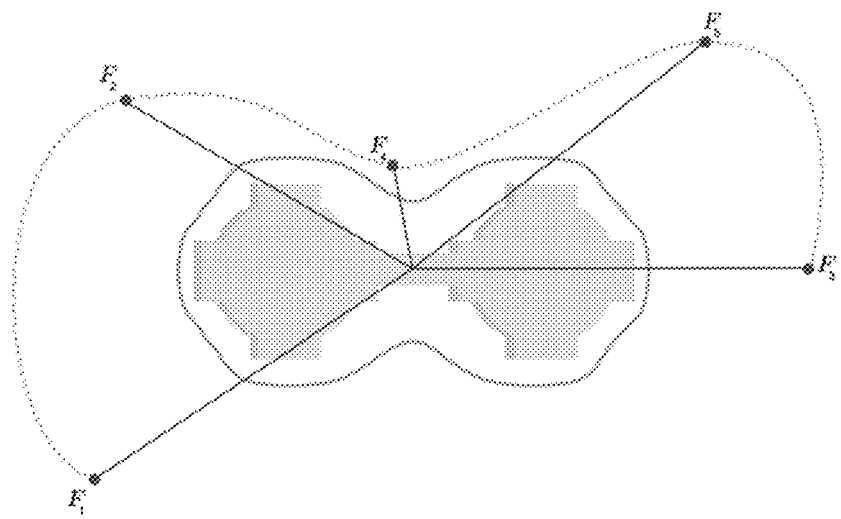
Figure 8
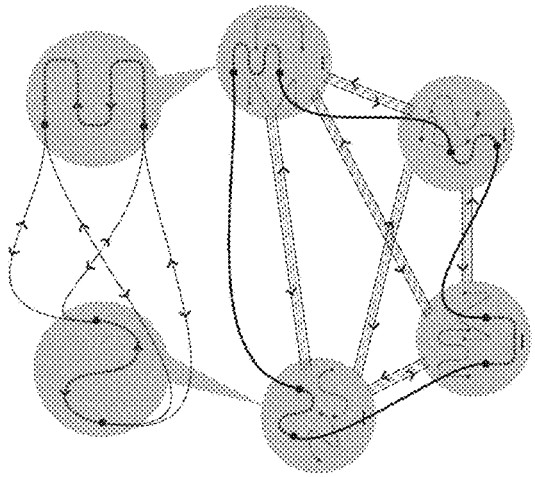
(a)     (b)
Figure 9

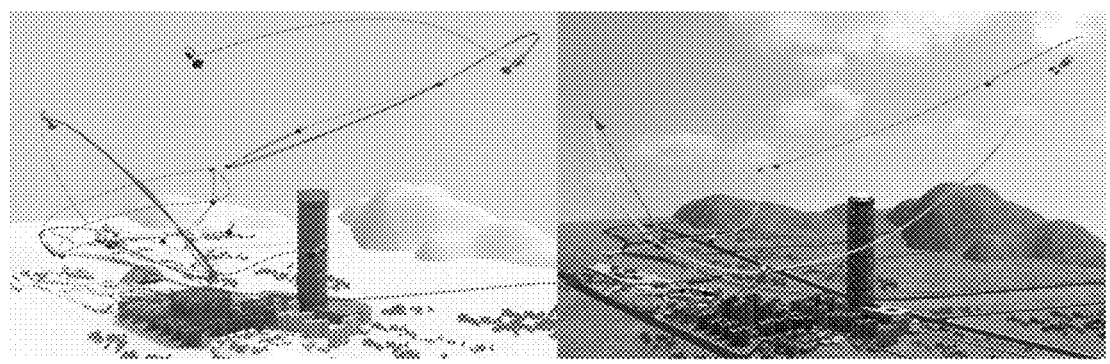
Figure 10A　　　　　Figure 10B
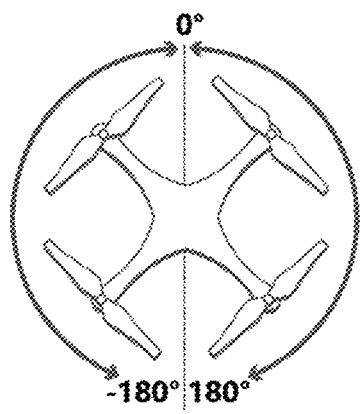 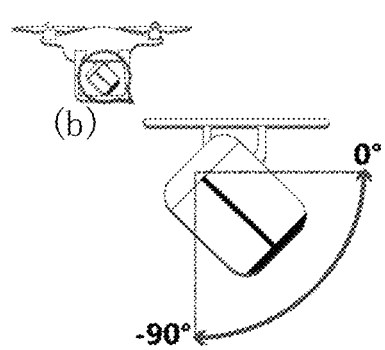
(a)　　　　　　　　　(c)
Figure 11
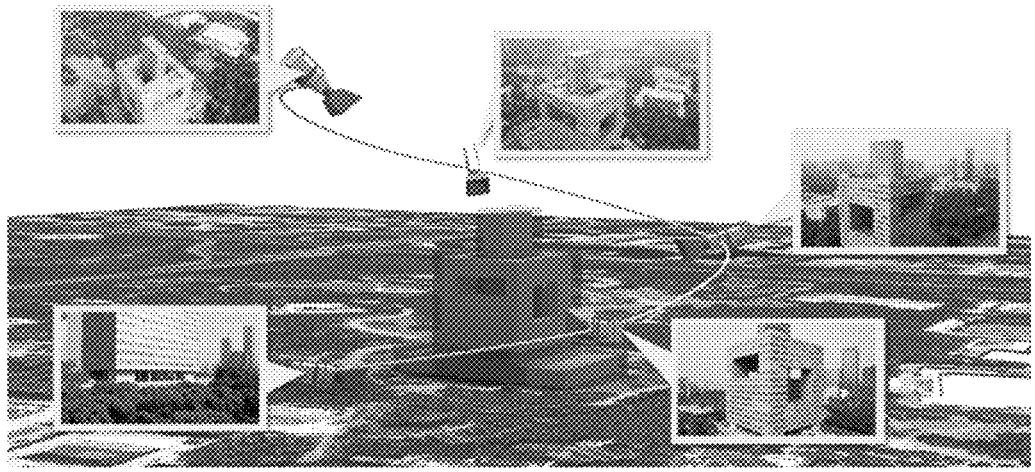
Figure 12

UAV FLIGHT PATH GENERATING METHOD AND DEVICE

CROSS-REFERENCE TO RELATED APPLICATIONS

The present application claims priority of Chinese patent application No. 201711111924.9, filed on Nov. 13, 2017, and the content thereof is entirely incorporated herein by reference.

TECHNICAL FIELD

The present invention relates to the field of computer graphics technologies, and in particular, to a method, an apparatus, a storage medium and a device for generating a flight path of a drone.

BACKGROUND

With the development of unmanned aerial vehicle (UAV) technology and the prices of drones go down, they become more popular in a wide variety of tasks. In particular, drones are increasingly widely used by professional, as well as amateur photographers and cinematographers for capturing aerial imagery and videos.

However, generating high quality aerial video footage with drones is highly challenging, even for experienced cinematographers. In addition to controlling the trajectory of the drone, one must simultaneously control the camera's direction. The common task actually requires two people to capture a drone video, one to pilot the drone, and another to control the camera at the same time. Furthermore, limited battery life and quickly changing lighting conditions make it difficult to rehearse the flight, or repeat the capture, if mistakes were made during the first attempt.

Recently, researchers have addressed problems such as designing smooth drone trajectories that interpolate user-specified keyframes (P. 2015. An interactive tool for designing quadrotor camera shots. ACM Trans. Graphics 34, 6, 238), and ensuring that planned trajectories are dynamically feasible (P. 2016. Generating dynamically feasible trajectories for quadrotor cameras. ACM Transactions on Graphics (Proc. SIGGRAPH 2016) 35, 4). In the work "An interactive tool for designing quadrotor camera shots", the process consists of prototyping a trajectory in a 3D simulator before executing it automatically in the real environment. The virtual trajectory is designed by creating an ordered collection of manually positioned viewpoints (keyframes). In "An interactive tool for designing quadrotor camera shots", the order of the keyframes is also specified by the user. A specific $C^4$ continuous trajectory is created between the keyframes ($C^4$ continuity ensures that the path obeys the physical equations of the quadrotor's motion). The feasibility of this trajectory is then analyzed and reported to the user, so she/he can iteratively alter the keyframe order. More recent work addresses the feasibility sue in an automated way "Generating dynamically feasible trajectories for quadrotor cameras" using an optimized time-warping of the trajectory.

Similarly to "An interactive tool for designing quadrotor camera shots", Gebhardt et al. propose a design tool where a camera path can be drawn and edited in a virtual environment and then optimized to ensure its feasibility. Given the multiple constraints (such as avoiding collisions), the optimization process does not guarantee to respect the user inputs: a trade-off is necessary between user inputs and conflicting constraints.

SUMMARY

The present invention provides a method, an apparatus, a storage medium and a device for generating a flight path of a UAV, so we can reduce the difficulty in controlling the flight of the UAV.

An embodiment of the present invention provides a method for generating a UAV flight path, including: generating at least one ordered key-view subset according to a key-views set of a landmark in a scene; generating local flight path based on the key-views subset, and define the cost function of local flight path. Based on the local flight path, by solving a generalized traveling salesman problem, at least one transit flight path to visit at least one landmark is obtained and the cost function of transit flight path is defined. According to the cost function of the local flight path and the cost function of the transit flight path, by solving the global cost function, a local flight path and a transit flight path are selected to generate the global flight path of the UAV according to the result of the solution.

An embodiment of the present invention further provides a UAV flight path generating apparatus, comprising: an ordered key-view generating part, configured to generate at least one ordered key-view subset according to a key-view set of a landmark in a scene; a local flight path generate part for generating a local flight path of a landmark and defining a cost function of the local flight path according to the key view sequentially arranged in the ordered key-view subset; and a transit flight path generation part for constructing a generalized travel sales based on the local flight trajectory, solving generalized travel salesman problem, obtaining at least one transit flight trajectory that accesses at least one landmark, and defining a cost function of the transit flight trajectory; a global drone flight path generation unit for generating a drone flight path according to a cost function of the local flight path and the cost function of the transit flight path, define the global cost function, solves the global cost function, and selects the local flight path and the transit flight path to generate the global flight trajectory of the UAV according to the result of the solution.

An embodiment of the present invention further provides a computer readable storage medium with a computer program on it which is executed by a processor to implement the steps of the method in the foregoing embodiment.

An embodiment of the present invention further provides a computer device, including a memory, a processor, and a computer program stored on the memory and executable on the processor, where the processor executes the program to implement the steps of the method in the foregoing embodiment.

According to an embodiment of the present invention, it generates a subset of the ordered key-view based on all the key-views, which makes the user does not have to specify the order of key perspectives. By constructing a generalized traveling salesman problem (STSP), multiple shortest global flight paths can be identified. By paying attention to the global cost function, both the better local flight path and the better transit flight path can be reconstructed to generate the optimal UAV flight path. As a result, users can easily choose interesting key perspectives for each of the landmarks, resulting in a complete, ordered sequence of key perspectives that can be used to achieve a satisfactory UAV flight path.

BRIEF DESCRIPTION OF DRAWINGS

To describe the technical solutions in the embodiments of the present invention, the following briefly introduces the accompanying drawings required for describing the embodiments or the prior art. Apparently, the accompanying drawings in the following description merely show merely—Are some embodiments of the present invention. For those skilled in the art, other drawings may be obtained based on these drawings without any creative work. In the drawings:

FIG. 7A to FIG. 7C are schematic diagrams of building a generalized cylinder based on the shape of a landmark according to an embodiment of the present invention;

FIG. 8 is a schematic diagram of a camera path adapted to a landmark outline obtained by interpolating ordered key-views in a generalized cylindrical coordinate system according to an embodiment of the present invention;

FIG. 9 is a schematic structural view of an embodiment of the present invention;

FIG. 10A is a schematic diagram of multiple local paths of a landmark in a scene according to an embodiment of the present invention;

FIG. 10B is a schematic diagram of an optimal local path of a landmark in a scene according to an embodiment of the present invention;

FIG. 11 is a schematic diagram of the control direction of a DJI drone camera in an embodiment of the present invention;

FIG. 12 is a schematic diagram of a flight path obtained according to a specified key-view according to an embodiment of the present invention;

DESCRIPTION OF EMBODIMENTS

To make the objectives, technical solutions, and advantages of the embodiments of the present invention clearer, the embodiments of the present invention are further described in detail below with reference to the accompanying drawings. Here, the exemplary embodiments of the present invention and the descriptions thereof are used to explain the present invention, but are not intended to limit the present invention.

Figure 1:
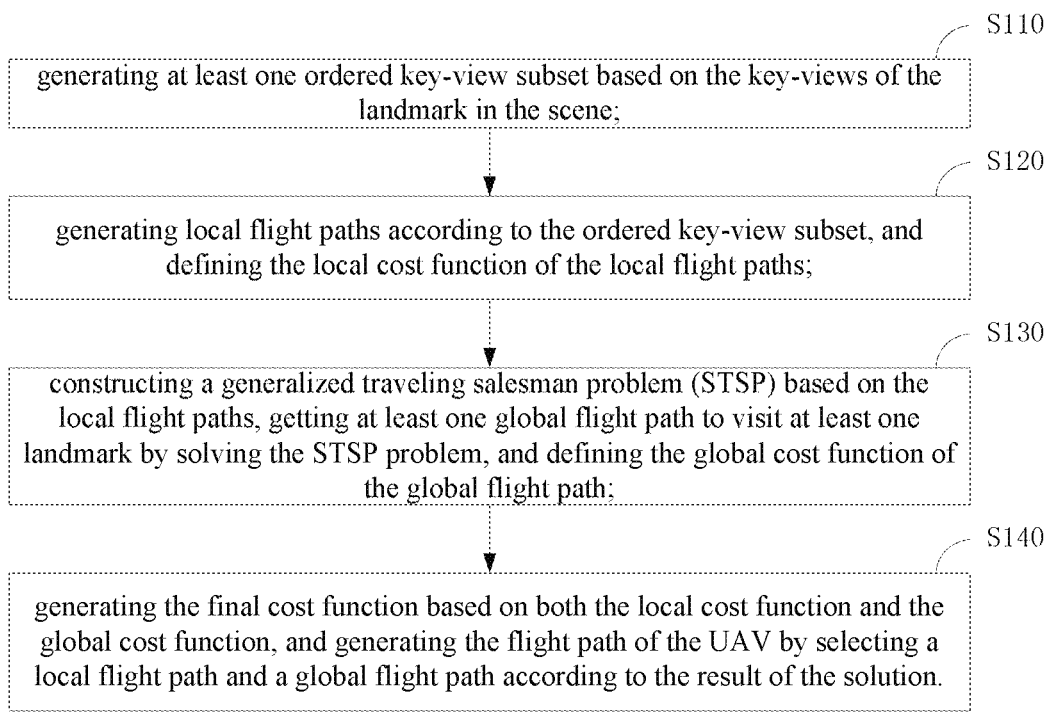
FIG. 1 is a flow chart of a method for generating a UAV flight path according to an embodiment of the present invention.

FIG. 1 is a flow chart of a method for generating a UAV flight path according to an embodiment of the present invention. As FIG. 1 illustrate, this method for generating a UAV flight path according to an embodiment, comprising:

Step S110: generating at least one ordered key-view subset based on the key-views of the landmark in the scene;

Step S120: generating local flight paths according to the ordered key-view subset, and defining the local cost function of the local flight paths;

Step S130: constructing a generalized traveling salesman problem (STSP) based on the local flight paths, getting at least one global flight path to visit at least one landmark by solving the STSP problem, and defining the global cost function of the global flight path;

Step. S140: generating the final cost function based on both the local cost function and the global cost function, and generating the flight path of the UAV by selecting a local flight path and a global flight path according to the result of the solution.

In the Step S110, it should contain at least one landmark in the scene. The key-view set of the landmark is made of at least one key-view. These key-views can be specified by users. The order of the key-views is not needed. In an embodiment, various possible ordered key perspective subsets can be generated according to the key-view set. The ordered key-view subset can include at least one key-view, with the key-views in sequential order. When talking about shooting with a drone, this key perspective may include information about the camera's position and orientation.

In the Step S120, the local trajectories stand for the drone path around one single landmark. For a landmark, each ordered key-view subset can generate a local flight path. Thus, a variety of possible ordered key-view subsets from the set of key-view can generate a variety of possible local flight paths. Different local flight paths may have the same form of cost function, but may have different cost function values. The cost function value can be used to evaluate the cost or cost of a local flight path. The cost function of the local flight path can be used to determine the preferred key viewing order.

In the Step S130, transit trajectories stand for the travelling path between landmarks. The cost functions of different transit flight paths may have the same representation. The cost function value of the transit flight path can represent the cost or cost of the transit flight path. Use the cost function of the transit flight path to determine the preferred order of landmark visits. By solving the generalized travel salesman problem, the shortest transit path under various landmark access sequences can be obtained.

In the Step S140, the global cost function is made of local trajectory cost function and transit cost function. The global cost function represents the overall cost or total cost of the UAV flight path, and it take into account both the better local flight path and the better global flight path. According to the solution of the global cost function, the best or better local flight path can be selected from the local flight paths corresponding to each ordered critical view subset, so as to determine the best or better order of at least one key perspective of the landmark, the best or better global flight path can be selected from a number of global flight paths that access at least one landmark to determine the best or better order of visits for multiple landmarks. The UAV flight path can be obtained by connecting the selected local flight path sand the global flight paths. In an embodiment, for a case where there is only one key viewing angle, multiple key viewing angles may be calculated through interpolation, and the case where only one landmark is used may be processed in a similar manner.

In this embodiment, by generating a possible subset of the ordered key perspectives according to the set of key-view, the user does not have to specify the order of the key perspectives. By constructing a generalized traveling salesman problem, multiple shortest global flight paths can be identified. By associating each local flight path with its cost function, a better local flight path can be determined. By associating each transit flight path with its cost function, a better transit flight path can be determined. Through the global cost function, both the better local flight path and the better transit flight path can be reconstructed to generate the optimal UAV flight path. As a result, users can easily choose interesting key perspectives for each of the landmarks, resulting in a complete, ordered sequence of key-views that can be used to achieve a satisfactory UAV flight path.

In the embodiment, the cost function of the local flight path and the cost function of the transit flight path are all related to the curvature, the direction of the key-views angle and the length of the path. For example, the direction of the key-views can be expressed as the average change or the average angle of the adjacent key-views. In the present embodiment, the evaluation of the flight path by the cost function related to the curvature, the viewing angle direction and the path length can satisfy the requirement of keeping the drone moving at a low curvature, changing the orientation of the drone in a smooth manner and keeping the flight path in a monotonic manner, and also satisfy some user preferences such as taking longer flight paths.

Figure 2:
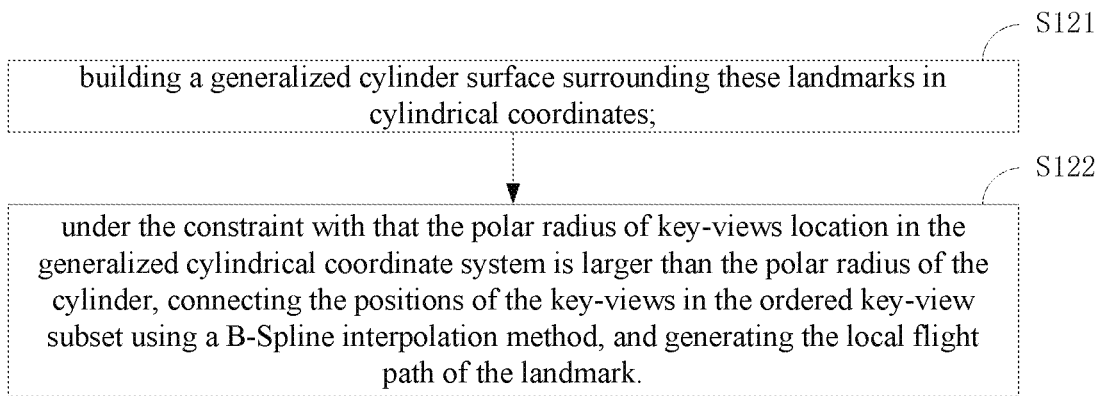
FIG. 2 is a flow chart of a method for generating a landmark local flight path according to an embodiment of the present invention.

FIG. 2 is a flow chart of a method for generating a landmark local flight path according to an embodiment of the present invention. As FIG. 2 illustrate, in the Step S120, generating local flight paths according to the ordered key-view subset, and defining the local cost function of the local flight paths, includes:

Step S121: building a generalized cylinder surface surrounding these landmarks in cylindrical coordinates;

Step S122: under the constraint with that the polar radius of key-views location in the generalized cylindrical coordinate system is larger than the polar radius of the cylinder, connecting the positions of the key-views in the ordered key-view subset using a B-Spline interpolation method, and generating the local flight path of the landmark.

In this embodiment, the UAV may be avoided from colliding with the landmark during the flight by using the constraint that the key-view is larger than the polar diameter of the cylinder in the cylindrical coordinate system. Using B-spline interpolation, connecting each key-view of a single landmark can make the local flight path as smooth as possible and prevent the local flight path from conflict with the landmark by interpolation.

In embodiments, a drone path can be generated based on a coarse 2.5D or 3D model of a scene.

In embodiments, in the step S120, we can define the local trajectory cost function as:

$$Q(t_j) = \alpha_j (1+\kappa_j)(1+\nu_j) e^{-(o_k - l_j)^2}$$

Where $\kappa_j$ measures the mean curvature along $t_j$ and $\nu_j$ computes the average angle between successive camera view direction pairs along the trajectory. In our implementation, we compute $\kappa_j$ and $\nu_j$ by sampling the trajectory densely, with one sample every 10 meters. The weight $\alpha_j$ counts the number of local extreme a of the elevation and the distance from the geometric center of the land mark along $t_j$. Finally, the last term of (6) is designed to decrease as the trajectory length increases for carefully-observed landmarks, and vice versa for casual landmarks. This is achieved by setting $o_k=0$ in the former case, and $o_k=1$ in the latter.

In embodiments, the values of $\kappa_j$, $\nu_j$ and $l_j$ are all normalized, such that their maximum value for each landmark is 1.

Figure 3:
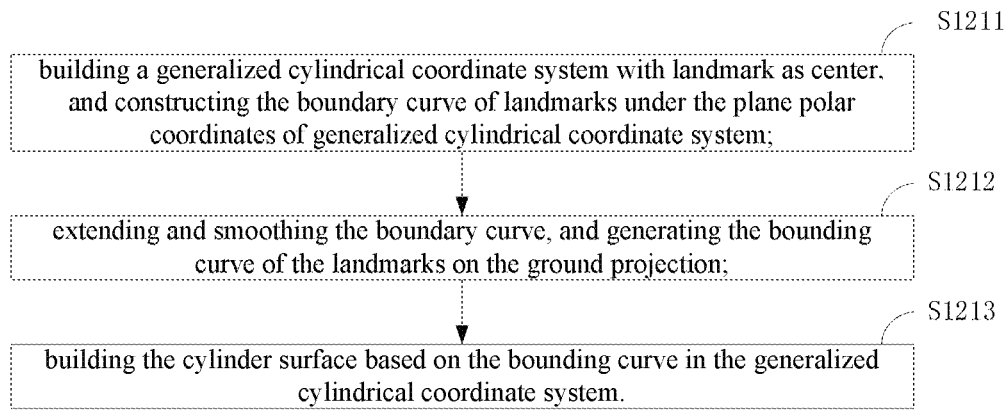
FIG. 3 is a flow chart of a method for establishing a cylinder surrounding a landmark according to an embodiment of the present invention.

FIG. 3 is a flow chart of a method for establishing a generalized cylinder surrounding a landmark according to an embodiment of the present invention. As FIG. 3 illustrated, in Step S121, the method about building a generalized cylinder surface surrounding these landmarks in cylindrical coordinates, comprising:

Step S1211: building a generalized cylindrical coordinate system with landmark as center, and constructing the boundary curve of landmarks under the plane polar coordinates of generalized cylindrical coordinate system;

Step S1212: extending and smoothing the boundary curve, and generating the bounding curve of the landmarks on the ground projection;

Step S1213: building the cylinder surface based on the bounding curve in the generalized cylindrical coordinate system.

In this embodiment, the polar radius of the landmark's ground projection is usually the maximum polar radius of the landmark. Bounding curve of the landmarks on the ground can make the cylinder well surrounded by landmarks. By expanding the bounding curve, the UAV flight path can be kept at a distance from the landmark, making the flight of the UAV safer.

In this embodiment, the landmark's shape is given as a 2.5D shape (a 2D shape with height), the initial bounding curve is obtained by simply dilating the shape by the safety zone width parameter $\varepsilon>0$. If the landmark is provided as a 3D mesh model, let $P=\{(P_x, P_y, P_z)\}$ denote the set containing all the vertices of the mesh, bounding curve is defined in polar coordinates as:

$$R(\phi) = \max_{\{\Phi(p_x, p_y) = \phi\}_{p \in P}} D(p_x, p_y) + \varepsilon$$

where $D(\cdot)$ and $\Phi(\cdot)$ convert a 2D point $(P_x, P_y)$ into distance and angle with respect to the geometric center. Note that the distance R for a given direction $\varphi$ is defined as the maximum over all heights, thus projecting the 3D model onto a 2D curve; see also FIG. 7B.

This initial bounding curve is next smoothed and dilated by iteratively performing the following operation k=5 times, which yields a smooth profile for a generalized cylinder that encloses the landmark (FIG. 7C):

$$R^{k+1}(\phi) = \max\left(R^k(\phi), \frac{R^k(\phi - \Delta\phi) + R^k(\phi + \Delta\phi)}{2}\right)$$

where we set $\Delta\varphi=0.1\pi$ by default. Max stands for the maximum value, $\Delta\varphi$ stands for the variation of the angle. $R^0(\phi)$, $R^0(\phi-\Delta\phi)$, $R^0(\phi+\Delta\phi)$ are the initial value before smoothing.

In this embodiment, based on the generalized cylinder defined by $R(\varphi)$ above, the cylindrical coordinates for a given point $P=\{(P_x, P_y, P_z)\}$ are given by:

$$\phi(p)=\Phi(p_x,p_y)$$

$$r(p)=D(p_x,p_y)/R(\phi(p))$$

$$z(p)=p_z/H$$

where H is the maximum height of the landmark.

In this embodiment, by definition, the landmark is enclosed by a unit cylinder $r\leq 1$ and $0\leq z\leq 1$ in this cylindrical coordinate space. All key-views $f_i \in F_s$ are outside of this unit cylinder, i.e., $r(f_i)>1$ for all i.

Figure 4:
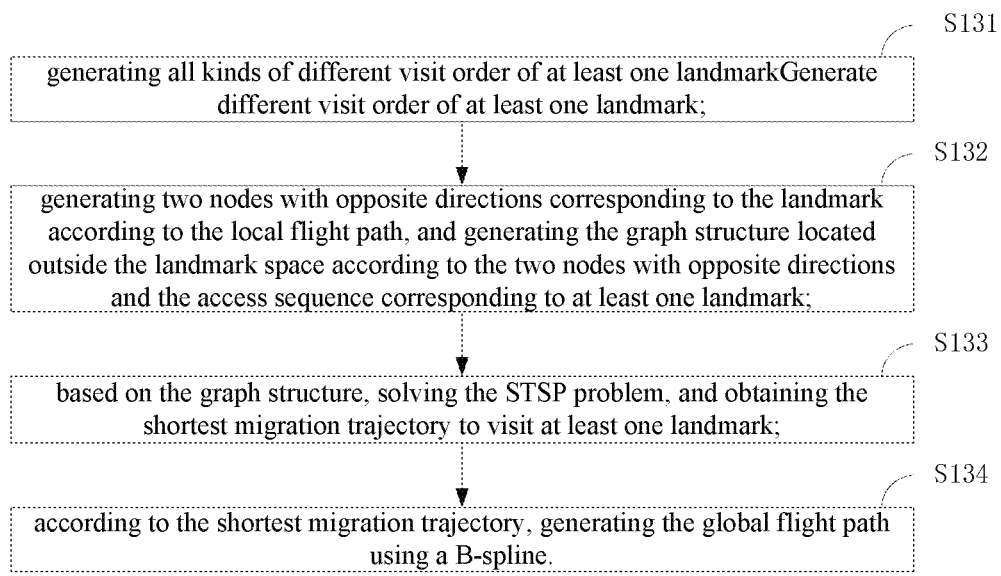
FIG. 4 is a schematic flowchart of a method for generating a global flight path according to an embodiment of the present invention.

FIG. 4 is a schematic flowchart of a method for generating a global flight path according to an embodiment of the present invention. As FIG. 4 illustrated, in the Step S130, constructing a generalized traveling salesman problem (STSP) based on the local flight paths, getting at least one global flight path to visit at least one landmark by solving the STSP problem, includes:

Step S131: generating all kinds of different visit order of at least one landmark;

Step S132: generating two nodes with opposite directions corresponding to the landmark according to the local flight path, and generating the graph structure located outside the landmark space according to the two nodes with opposite directions and the access sequence corresponding to at least one landmark;

Step S133: based on the graph structure, solving the STSP problem, and obtaining the shortest migration trajectory to visit at least one landmark;

Step S134: according to the shortest migration trajectory, generating the global flight path using a B-spline.

In the above Step S131, for a case where only one landmark is included, two types of access sequences with different inbound and outbound directions can be generated. In the above step S132, locating the generated graph structure in the landmark space can prevent the transition locus from colliding with the landmark. In the graph structure, two nodes in the opposite direction correspond to the local flight paths with opposite directions of motion. Each local flight path of each landmark corresponds to a node cluster, and a pair of nodes in opposite directions corresponding to all local flight paths of each landmark form a node cluster. In the above Step S133, a shortest transit path can be obtained for each of a local flight path and a landmark access order.

In the above-described Step S134, a smoother global flight path can be generated using the B-spline.

In this embodiment, in above Step S130, the cost function for a given transit trajectory $t_{jj'}^{mm'}$ is defined as:

$$Q(t_{jj'}^{mm'})=(1+\kappa_{jj'}^{mm'})(1+\nu_{jj'}^{mm'})/l_{jj'}^{mm'}$$

Where $\kappa_{jj'}^{mm'}$, $\nu_{jj'}^{mm'}$ and $l_{jj'}^{mm'}$ denote the mean curvature along the trajectory, the average change in camera view direction, and the length of the trajectory.

Figure 5:
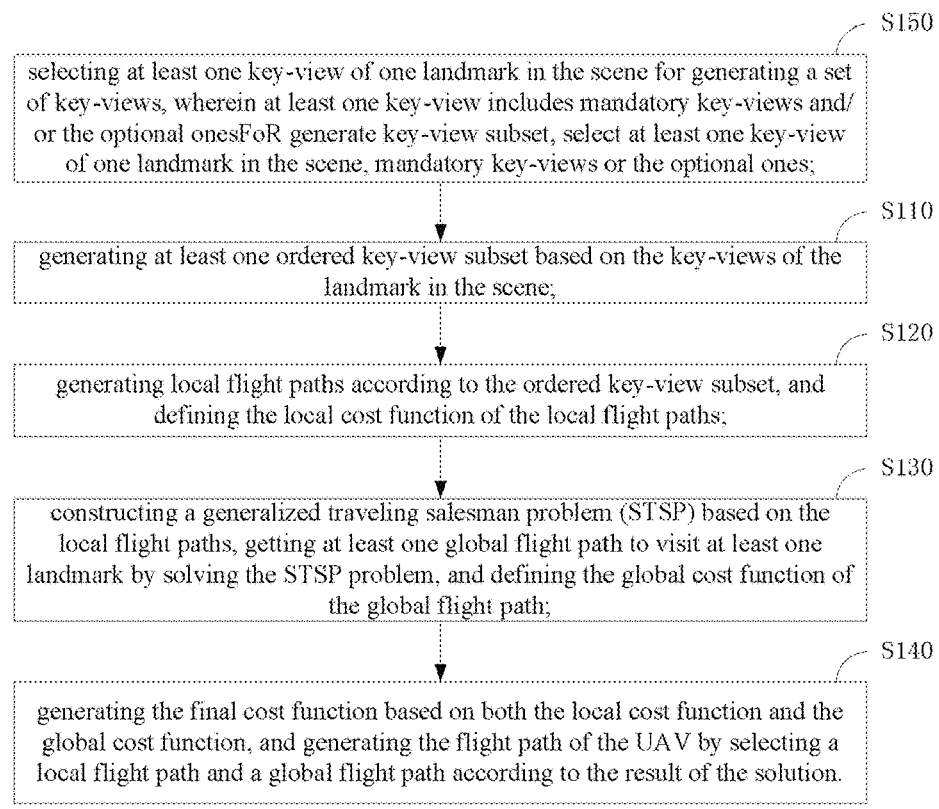
FIG. 5 is a flow chart of a method for generating a flight path of a drone according to another embodiment of the present invention.

FIG. 5 is a flow chart of a method for generating a flight path of a drone according to another embodiment of the present invention. As FIG. 5 illustrated, before Step S110 which is generating at least one ordered key-view subset based on the key-views of the landmark in the scene, includes:

Step S150: selecting at least one key-view of one landmark in the scene for generating a set of key-views, wherein at least one key-view includes mandatory key-views and/or the optional ones.

In the above Step S150, the key-views in the key-view subset are unordered.

In this embodiment, the user can specify the interest key-views and has the option of tagging each key-view as mandatory, meaning that this or a nearby view must be included in the flyby, or as optional. Therefore, it can meet a variety of demand and require less user flight experience or skill.

In this embodiment, in the above Step S150, specify at least one critical perspective by manually controlling the UAV to fly in the actual scene. In this embodiment, from the actual point-to-point flight, the camera pose and the camera pose of each frame can be extracted, so that the visual content can be previewed more realistic.

In embodiments, the user can specify a key-view using an interactive virtual scene preview tool. In other embodiments, the UAV can be manually controlled to fly in the actual scene, and the perspective key frame is selected according to the actual perspective. The actual pose and attitude of the camera at each frame can be extracted from actual point-to-point flight, allowing for a more faithful preview of the visual content without the need for a detailed scene 3D model.

Figure 6:
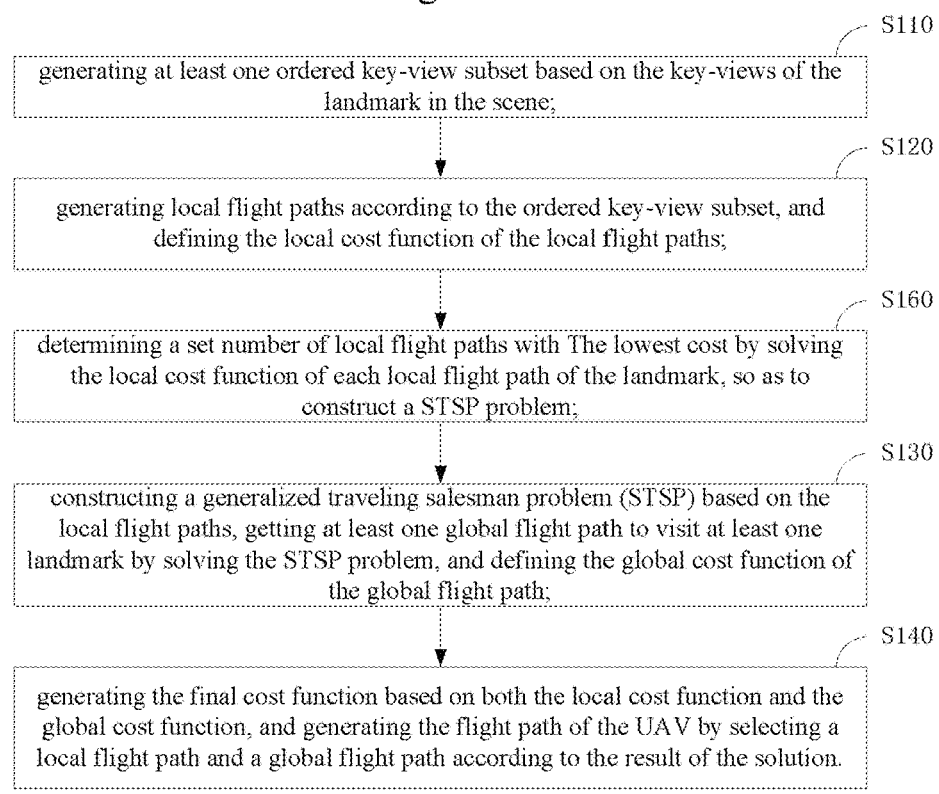
FIG. 6 is a flow chart of a method for generating a UAV flight path according to another embodiment of the present invention.

FIG. 6 is a flow chart of a method for generating a UAV flight path according to another embodiment of the present invention. As FIG. 6 illustrated, before Step S130, which is constructing a generalized traveling salesman problem (STSP) based on the local flight paths, getting at least one global flight path to visit at least one landmark by solving the STSP problem, includes:

Step S160: determining a set number of local flight paths with the lowest cost by solving the local cost function of each local flight path of the landmark, so as to construct a STSP problem.

In this embodiment, some cost-less partial flight paths can be screened out by calculating the cost function of each local flight path. And further use the selected local flight path to generate the UAV flight path. This will reduce the number of possible flight paths and reduce the amount of computation required for subsequent steps.

To better understand the present invention, the following describes the implementation process and beneficial effects of the present invention by taking the UAV aerial video shooting as an example. It needs to be explained in advance that, because the camera is set on a drone, the camera may be equivalent to a drone for concepts involving trajectories, paths, motions.

a. Constructing Local Camera Moves

We first describe the construction of a camera trajectory for a given landmark, based on an ordered set of key-views Fs. The goal is to generate a smooth trajectory that starts from the first key-view in Fs and passes approximately through the remaining key-views according to their order in Fs, while avoiding entering into the clearance zone around that landmark.

To adapt the camera's move to the shape of the landmark, as well as to ensure that the trajectory does not collide with the landmark, we work in landmark-centric coordinates, which are essentially cylindrical coordinates, computed using a generalized cylinder that encloses the landmark. The axis of the cylinder is placed at the geometric center of the landmark (e.g., the gray dot in FIG. 7A). To define the profile of the enclosing generalized cylinder, we first construct a curve that encloses the landmark (FIG. 7B) using polarcoordinates, and then smooth the resulting curve (FIG. 7C).

Constructing a generalized cylinder based on a landmark's shape: given a landmark FIG. 7A, a generalized cylinder is defined using a bounding curve FIG. 7B in polar coordinates, which is then smoothed to yield the cylinder's profile FIG. 7C.

If the landmark's shape is given as a 2.5D shape (a 2D shape with height), the initial bounding curve is obtained by simply dilating the shape by the safety zone width parameter $\varepsilon > 0$. If the landmark is provided as a 3D mesh model, let $P = \{(P_x, P_y, P_z)\}$ denote the set containing all the vertices of the mesh. A bounding curve is then defined in polar coordinates as:

$$R(\phi) = \max_{\{\Phi(p_x,p_y)=\phi\}_{p\in P}} D(p_x, p_y) + \varepsilon \quad (1)$$

where $D(\cdot)$ and $\Phi(\cdot)$ convert a 2D point $(p_x, p_y)$ into distance and angle with respect to the geometric center. Note that the distance R for a given direction $\varphi$ is defined as the maximum over all heights, thus projecting the 3D model onto a 2D curve; see also FIG. 7B.

This initial bounding curve is next smoothed and dilated by iteratively performing the following operation k=5 times, which yields a smooth profile for a generalized cylinder that encloses the landmark (FIG. 7B):

$$R^{k+1}(\phi) = \max\left(R^k(\phi), \frac{R^k(\phi - \Delta\phi) + R^k(\phi + \Delta\phi)}{2}\right) \quad (2)$$

where we set $\Delta\varphi = 0.1\pi$ by default.

Based on the generalized cylinder defined by R($\varphi$) in (2), the cylindrical coordinates for a given point $P = \{(P_x, P_y, P_z)\}$ are given by:

$$\phi(p) = \Phi(p_x, p_y) \quad (3)$$

$$r(p) = D(p_x, p_y)/R(\phi(p)) \quad (4)$$

$$z(p) = p_z/H \quad (5)$$

where H is the maximum height of the landmark. By definition, the landmark is enclosed by a unit cylinder $r \leq 1$ and $0 \leq z \leq 1$ in this cylindrical coordinate space.

We assume all key-views are outside of this unit cylinder, i.e., $r(f_i) > 1$ for all i. The camera positions are converted into this cylindrical space, and their $\varphi$, r, and z coordinates are approximated using a B-spline of degree 5, resulting in a C4 smooth trajectory. As shown in FIG. 4, the trajectory is nicely adapted to the shape of the landmark. We further optimize the B-spline control points such that (i) the key-views are well approximated by the trajectory, and (ii) the convex hull of every six successive control points lies outside the unit cylinder. The latter condition prevents the curve from entering the enclosing generalized cylinder.

Note that the above is a somewhat conservative collision avoidance strategy. For example, if the landmark consists of two towers, as shown in FIG. 4, they are treated as a single landmark and enclosed by a single generalized cylinder. Thus, the trajectory will not enter the area between the two towers, even though there may be open space above a certain height. Alternatively, the user could specify the two towers as two separate landmarks, in which case each would be enclosed by an individual cylinder. In this case, placing key-views in between the two towers could result in trajectories that pass between them.

b. Evaluating Local Camera Moves

Above we have seen how to construct a camera trajectory given an ordered sequence of key-views Fs. However, providing such a sequence is a challenging task, particularly for inexperienced users, since it requires envisioning the final trajectory and the resulting aerial video footage. Furthermore, in many cases there is a multitude of choices of which subset of the key-views should be included in the trajectory and in which order these views might be visited. The choice of which of these subsets to use also might depend on which landmark was visited before the current one, and which will be visited next. Consequently, our system enumerates all of the possible subsets and orderings of key-views (in accordance with the user's tags), and quantifies the quality of each resulting trajectory. The subsequent global optimization (Next Section) is then able to determine which trajectory to use while visiting each landmark, and the order in which the landmarks will be visited.

Let $F = \{f_i | (0 < i \leq n)\}$ denote the set of all the key-views for a particular landmark. F consists of two subsets, F consists of two subsets, $F = Fm \cup Fo$, where Fm denotes the mandatory key-views and Fo denotes the optional ones. Thus, we generate all the possible sets Fs that contain all the mandatory frames Fm and zero or more optional frames from Fo, such that the total number of key-views in Fs does not exceed a user specified maximum. In addition, if indeed the user did not provide a specific ordering of the key-views, we generate all the possible orderings of the views in each subset Fs.

Even though all generated camera trajectories are smooth, some may be better than others. Intuitively, we would prefer camera moves that maintain low curvature along the camera trajectory, and change the camera heading and tilt in a smooth fashion. Furthermore, we found that monotonicity is desirable: the drone should avoid alternating between increasing and decreasing its altitude too many times, or alternating between increasing and decreasing its distance from the landmark. Finally, a longer trajectory is preferred for landmarks that, according to the user's tagging, should be observed carefully.

Based on the considerations described above, we define the cost for a given trajectory $t_3$ as:

$$Q(t_j) = \alpha_j(1+\kappa_j)(1+\nu_j)e^{-\alpha_k-l_j)^2} \quad (6)$$

Where $\kappa_j$ measures the mean curvature along $t_j$ and $\nu_j$ computes the average angle between successive camera view direction pairs along the trajectory. In our implementation, we compute $\kappa_j$ and $\nu_j$ by sampling the trajectory densely, with one sample every 10 meters. The weight $\alpha_j$ counts the number of local extrema of the elevation and the distance from the geometric center of the land mark along $\kappa_j$. Finally, the last term of (6) is designed to decrease as the trajectory length increases for carefully-observed landmarks, and vice versa for casual landmarks. This is achieved by setting $o_k=0$ in the former case, and $o_k=1$ in the latter. Note that the values of $\kappa_j$, $v_j$ and $l_j$ are all normalized, such that their maximum value for each landmark is 1.

All the local camera trajectories computed under different ordered view sets Fs are evaluated using the above cost function (6). However, instead of simply choosing the local trajectory with the lowest cost for each landmark, we defer this decision to the global optimization stage described in the following section. In this manner, the optimal combination of local trajectory choice and the global landmark ordering is performed simultaneously. Nevertheless, to reduce the search space, we only keep for each landmark the top J≤4 local trajectories with the lowest cost, discarding the others.

c. Transit Camera Movement Planning

We have established for each landmark m a set of the top ranked candidate local trajectories $T^m=\{t_j^m\}$, with $\|T_m\|\le J$. Our goal now is to determine an order for visiting the landmarks, and to select a single local trajectory for each landmark, so as to minimize the overall cost of the resulting trajectory. The above is a difficult combinatorial optimization problem, which we solve by formulating it as a generalized version of the Traveling Salesman Problem (TSP), also known as the Set TSP (STSP).

Given a graph with several disjoint subsets (clusters) of nodes, the goal of STSP is to find a shortest tour, which visits each cluster exactly once. The standard TSP may be viewed as a special case of STSP, and therefore STPS is also NP-hard.

In our case, each local trajectory corresponds to two nodes in the graph, since a trajectory may be traversed in two directions. The nodes corresponding to all the trajectories in $T^m$ form one cluster of nodes in the graph. The edges of the graph correspond to the transit trajectories $t_{jj'}^{mm'}$ that connect the end of a local trajectory $t_j^{mm'}$ of landmark m to the beginning of a local trajectory $t_{j'}^{mm'}$ of landmark m'; see an illustration in FIG. 5. Again, each transit trajectory corresponds to two directed edges in the graph. The cost of each node is given by eq. (6), while the edge costs are defined in a similar fashion by eq. (7), as described in more detail below.

FIG. 9 is schematic of the graph structure in this embodiment. FIG. 9(a) shows the graph structure including two local flight paths. Each local flight path corresponds to two nodes, including an entry point and an exit point. There are four possible transit trajectories between each pair of local trajectories. Part (b) of FIG. 9 shows a graph structure containing four local flight paths. Each candidate local path set corresponding to each landmark is defined as a graph node, and each node is a cluster (set) of at least one candidate path.

After defining the graph, we describe how to construct smooth and collision-free transit trajectories, and define the associated cost function. Given two candidate trajectories, $t_j^m$ for landmark m and $t_{j'}^{m'}$ for landmark m', we compute the connecting trajectory $t_{jj'}^{mm'}$ by superimposing the space with a grid and constructing a graph connecting the cells unoccupied by landmarks and other potential obstacles. The shortest path from the cell containing $t_j$'s end point to the cell containing $t_{j'}$'s start point is then computed using Dijkstra's algorithm. To generate a smooth curve, we use again a B-spline of degree 5 that approximates the centers of the resulting sequence of cells.

Note that a pair of trajectories $t_j^m$ and $t_{j'}^{m'}$ may be chained together using four different transit trajectories (see the top illustration in FIG. 9). Since each landmark m may have up to J candidate local trajectories and there are four possible transit trajectories between each pair of local trajectories, the maximum number of trajectories we need to compute between landmarks m and m' is $4\times J^2$. Similarly, to local trajectories, we again prefer transit trajectories that are short and maintain low curvature. Hence, the cost function for a given transit trajectory $t_{jj'}^{mm'}$ is defined as:

$$Q(t_{jj'}^{mm'})=(1+\kappa_{jj'}^{mm'})(1+v_{jj'}^{mm'})/l_{jj'}^{mm'} \quad (7)$$

Where $\kappa_{jj'}^{mm'}$, $v_{jj'}^{mm'}$ and $l_{jj'}^{mm'}$ denote the mean curvature along the trajectory, the average change in camera view direction, and the length of the trajectory.

In an embodiment, the user needs to specify a set of landmarks that should be included in the aerial video and specify a set of key perspectives corresponding to each landmark. Each of the key perspectives includes camera position and direction information. Key perspectives can be specified using an interactive virtual scene preview tool that uses a 3D model of the scene to present a scene preview view from various perspectives, as shown in FIG. 10A and FIG. 10B. In another embodiment, the UAV can be manually controlled to fly in the actual scene and select the key frame according to the actual angle of view. From the actual point based flight, the camera pose and camera pose for each frame can be extracted, so that the visual content can be previewed more faithfully without the need for a detailed scene made of fine 3D models.

FIG. 10A is a schematic diagram of multiple local paths of a landmark in a scene according to an embodiment of the present invention. As shown in FIG. 10A, each landmark can have 4 partial flight paths for each landmark after specifying the mandatory key perspectives and the optional key perspectives. FIG. 10B is a schematic diagram of an optimal local path of a landmark in a scene in an embodiment of the present invention. As shown in FIG. 10B, the optimal transit path is calculated and the final transit path is obtained by connecting multiple local paths with the optimal transit path.

The user has the option of tagging each key-view as mandatory, meaning that this or a nearby view must be included in the flyby, or as optional. Additionally, each landmark may be tagged as one that should be observed carefully or casually, indicating that the resulting video should spend more time observing landmarks of the former type. In the absence of such preferences, we treat all selected landmarks equally and treat all key-views as mandatory.

In the embodiment, the final UAV flight path can be obtained through the connection of the local motion path and the migration path.

Regardless of the way used to designate the key-views, our method requires at least a 2.5D model of the scene, which should include the landmarks, as well as any other object that should be taken into account in order to avoid collisions. Given such a model, a collection of landmarks, and a set of key-views for each landmark, our method proceeds in two phases. In the first phase, we generate for each landmark a collection of candidate local trajectories, or local camera moves, as shown in FIG. 10A in different color. Each candidate camera move approximately passes through a subset of the user-designated key-views, and is associated with a cost. The construction of local moves and the associated cost function are described in the next Article.

In the second phase, our goal is to select a single local camera move for each landmark, and determine the optimal order in which to chain these moves, generating connecting trajectories as necessary. This is done via combinatorial optimization, by formulating and solving an instance of the Set Traveling Salesman Problem. The optimization attempts to minimize the sum of the costs of the selected local moves, as well as the costs of the connection trajectories. Examples of the resulting trajectories are shown in FIG. 10B.

The invention will now be described based on examples of application of the method.

a. UAV System

We use the DJI Mavic Pro, a portable yet powerful drone, to capture our aerial videos. The dr one's flying movements consist of forward, backward, left or right along a horizontal axis, increasing and decreasing its altitude, and changing its heading clockwise or counterclockwise (FIG. 11(a)). It is equipped with a 4K/30 fps 12 megapixel camera, stabilized by a 3-axis mechanical gimbal. The camera tilt may be programmatically controlled in the range of [90, 0]; see FIG. 11(b). Our current implementation uses the DJIWaypointMission SDK in order to program the drone and the camera to follow the trajectory generated by our method. With this SDK it is possible to specify a sequence of up to 99 waypoints (physical locations to which the drone will fly). The desired camera heading and tilt may be specified for each waypoint. The drone then travels from one waypoint to the next at a preset speed, adjusting altitude, heading, and camera tilt as it advances. Thus, given a trajectory to follow, we place up to 99 samples along the trajectory, which yields the waypoints and the desired camera heading and tilt at each waypoint. Effectively, this means that the drone follows a roughly piecewise linear approximation of our smooth planned trajectory. Furthermore, the accuracy and the smoothness of the actual camera motion also depends on the accuracy of the drone's GPS. While our results demonstrate that the resulting aerial videos are reasonably smooth, in the future we plan to implement and use our own lower level drone control program that would be able to follow a planned trajectory in a more precise manner.

b. Aerial Videos

In fact, even a seemingly simple camera move around a single landmark can be difficult to execute when piloting the drone using manual controls. For example, FIG. 12 shows a simple task of viewing a building while passing through five key-views placed on a spiral. An experienced drone operator was not able to pilot the drone in a smooth and accurate manner along the desired trajectory, even after several attempts, the best of which is included in the supplementary video. In contrast, our tool successfully produced a smooth spiral-like trajectory by using interpolation in generalized cylindrical coordinates.

Figure 13:
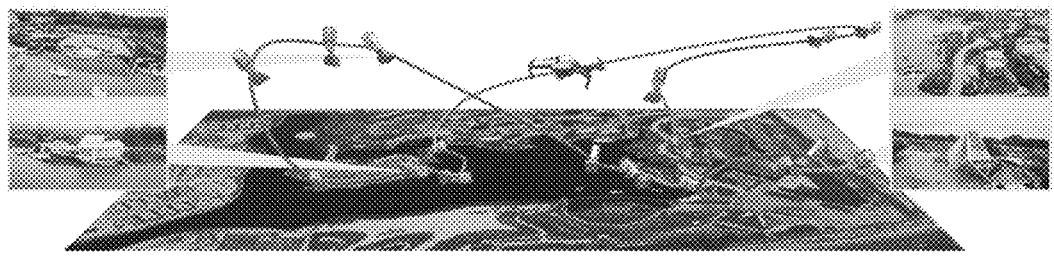
FIG. 13 to FIG. 15 are schematic diagrams of a scenario of generating a flight path of an UAV by using the method according to the embodiment of the present invention.

FIG. 13 shows a drone flight path generated using the method of the present invention. Given several landmarks and some key perspectives (both sides of the image show the corresponding key perspectives), a viable local flight path is generated for each landmark, an ideal flight order is determined, and the migration path is used to connect all local flight paths into a continuous global flight path.

Figure 14:
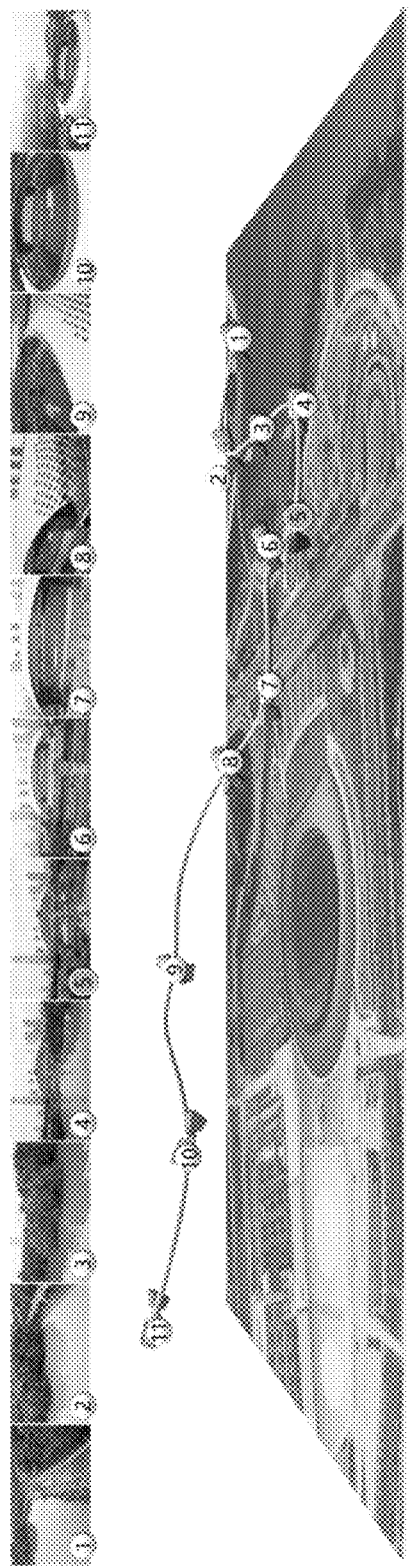

FIG. 14 illustrates the drone flight trajectory in the Shenzhen Bay. this flyby has three landmarks (highlighted in red), and the generated trajectory visits 11 key-views. An optional key-view that was selected is indicated by a brown camera icon. The corresponding frames are shown on top.

Figure 15:
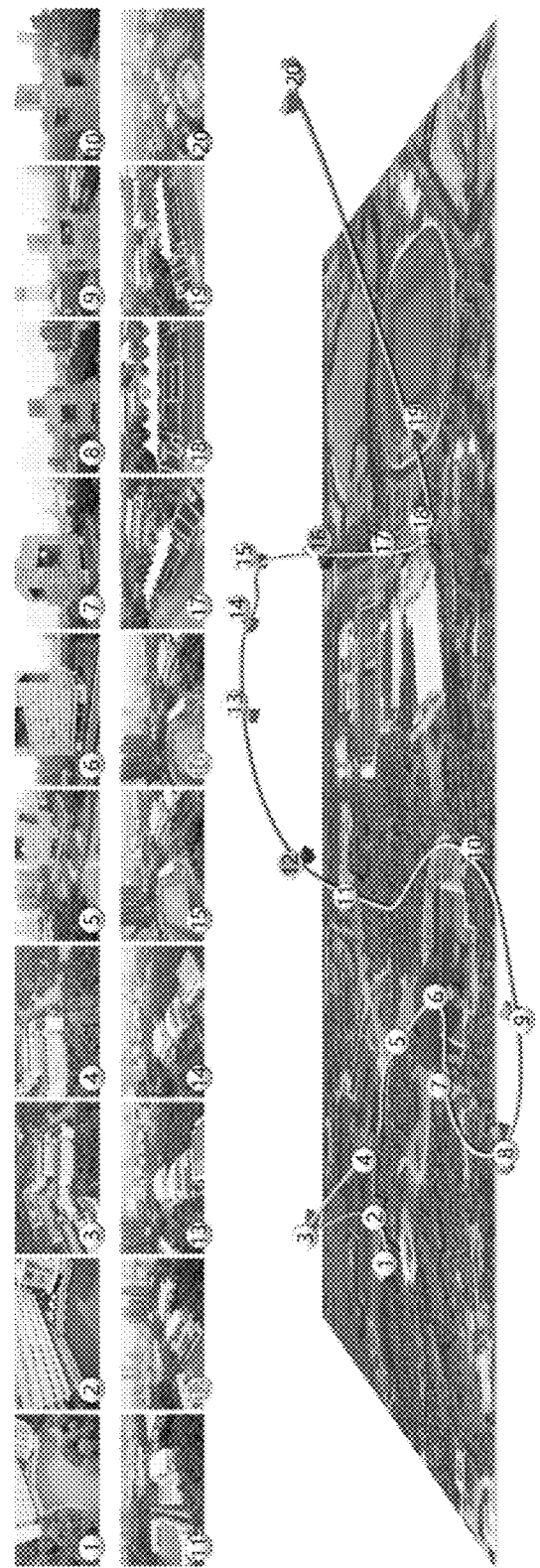
Figure 16:
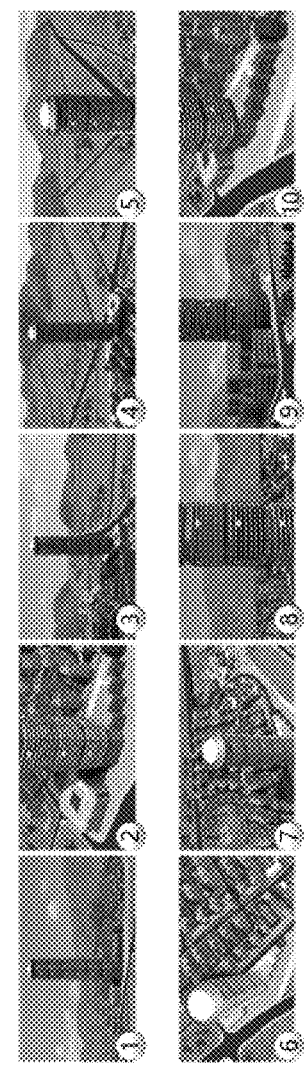
FIG. 16 is a schematic diagram of a scenario in which flight paths are generated in a sequence without specifying a critical viewing angle according to an embodiment of the present invention.
Figure 16:
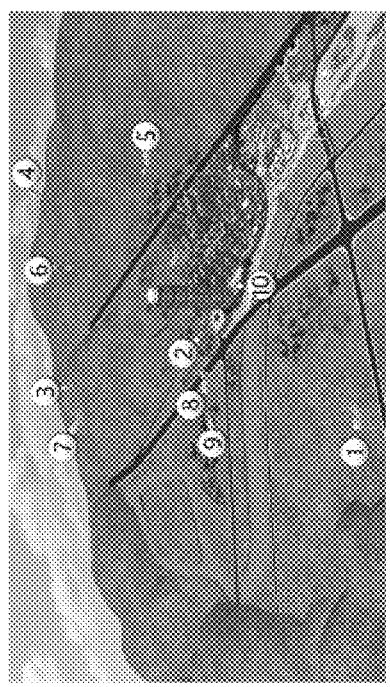
Figure 17:
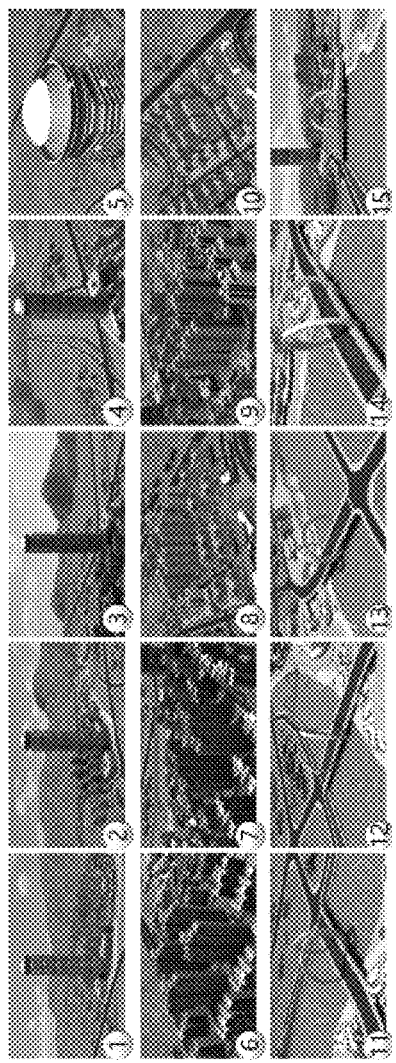
FIG. 17 is a schematic diagram of a scenario of generating a flight path sequentially according to a specified key-view according to an embodiment of the present invention.
Figure 18:
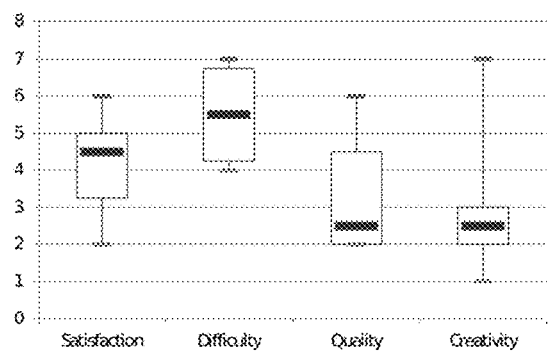
FIG. 18 is an assessment of the method of flight path generation used in FIG. 17.
Figure 19:
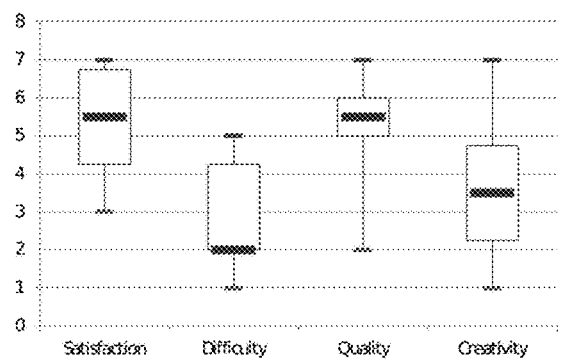
FIG. 19 is an assessment of the method of flight path generation used in FIG. 16.

FIG. 15 shows the example of the University Campus: this flyby has four landmarks (highlighted in red), and the generated trajectory visits 20 key-views. Two optional key-views that were selected are indicated by brown camera icons. The corresponding frames are shown on top.

Three of the real scenes are shown in FIGS. 13, 14, and 15, respectively. One of our virtual scenes is shown in FIG. 10A. As shown in these figures, the test scenes contain landmarks of different shapes and sizes. More detailed statistics about these test scenes are summarized in Table 1. Test scene statistics contains: number of landmarks (#L), key-views for each landmark (#KV), number of waypoints (#WP), distance $d_\omega$ between waypoints in meters, local trajectory generation time $T_l$, and global phase time $T_g$.

TABLE 1

| | | Test scene statistics | | | | |
|---|---|---|---|---|---|---|
| FIG. | #L | #KV | #WP | $d_\omega$ | $T_l$ | $T_g$ |
| 10B | 4 | 6, 3, 3, 6 | 99 | 15 | ≈25 s | ≈12 m |
| 14 | 3 | 3, 3, 5 | 99 | 20 | ≈10 s | ≈8 m |
| 15 | 4 | 6, 4, 4, 6 | 99 | 35 | ≈35 s | ≈20 m |
| 13 | 3 | 5, 5, 5 | — | — | ≈15 s | ≈5 m |

The key-views for the virtual scene were specified using an interactive preview tool, while those for the real scenes were selected from recordings of exploratory flybys. The exploratory flybys are manually controlled, and as a result the camera trajectory is typically quite complicated and highly non-smooth. Furthermore, some of the scenes were explored using several separate flybys. Thus, the set of user-selected key-views does not necessarily have a clear natural ordering. The selection and the ordering of the key-views are done automatically by our method, and are shown in FIGS. 14 and 15 along with the complete trajectories. The resulting captured aerial video sequences are included in the supplementary materials, sped up by a factor of ×4 or ×8. Even with the accelerated playback, the camera motion is quite smooth, and the most of the transitions between landmarks appear natural.

As may be seen from Table 1, almost all of the computation time is spent during the second global phase. In fact, most of it is due to our current brute-force un-optimized search for collision-free shortest paths among landmarks, which uses a high-resolution grid.

c. User Study

We have also conducted a preliminary user study to evaluate different qualitative criteria using two versions of our path design tool. Version auto is the automated tool described in this paper, which constructs camera moves from a selected and unordered list of viewpoints and chains them together. Version manual is a downgraded version of the tool, in which the user selects which viewpoints to include in the trajectory, and determines their order. An interpolating path is then computed in the same manner as in the auto version. Thus, the tools differ only in the manner in which viewpoints are selected and ordered, but not in the manner interpolation is done. The manual version, in fact, is similar in terms of its UI to the interactive tools described by Joubert et al. and Gebhardt et al.

A group of 6 students was split into two equal groups. Students from the first group designed a path for a single landmark with ten viewpoints, shown in FIG. 10(top), using version auto. Students from the second group designed a path for a scene with three landmarks with five viewpoints for each landmark, shown in FIG. 10(bottom), using version manual. Groups then switched tools and tasks. Both auto and manual users shared the same set of input viewpoints for the same task.

Each participant rated his results for each of the two tasks he or she performed, by answering four questions using a 7 point Likert scale: (a) How satisfied are you with the generated result? (b) How difficult is it to create the path? (c) What is the quality of the generated path? and (d) How well does the tool support your creativity? Results are presented in FIG. 11 and show important differences in terms of difficulty: in the auto version first and third quantile ranges from 4 (neutral) to 6 (very easy), while the manual version quantiles range from 2 (very difficult) to 4 (neutral). There are also significant differences in terms of quality: the manual quantiles range from 2 (fair) to 4 (good), while the auto version quantiles range from 5 (very good) to 6 (excellent). Among the students, one in each group already had experience in piloting drones, and the results also show that the auto version was better appreciated in terms of satisfaction and creativity.

In embodiments, given a set of all possible key-views for a given landmark, some possible camera motion paths may be automatically generated. Each camera's movement through most of the key-views while avoiding collisions. Each camera's motion path can be measured at the cost of its quality. These costs can be calculated by combining some camera motion quality standards. By selecting a higher-quality local camera movement for each landmark and connecting them using a smooth transit path, a global continuous flight path can be generated that can access and capture all landmarks. The best order of camera movement is obtained by constructing and solving a generalized TSP problem where a set of cities consists of several clusters and the optimal path must be the path that a salesman visiting a point in each cluster.

Users can easily choose for each landmark some interesting key perspectives, and get a complete sequence of ordered key perspectives. By interpolating them, a satisfactory UAV flight path can be obtained. The user specifies a superset of possible key perspectives for each place mark without the need to specify the order of key perspectives and leaves the design of the camera around the design of each landmark movement and the entire flight path left to the program. Thus, users are able to focus on specifying the visual content that should be captured by the aerial video, rather than on the difficult lower level aspects of designing and specifying the precise drone and camera motions.

In short, the method in the embodiment of the present invention has the following advantages:

1) A new type of advanced UAV trajectory design method is purposed, which can generate a smooth flight path for continuously shooting aerial video for landmark group.

2) As long as the user simply give the inputs of the key-views that the landmark wants, the smooth flight path can be automatically generated without designing the sequence of the entire aerial photography path, and with the high degree of automation. Compared with the manual flight, with great convenience, the auto one reducing the difficulty of novice users to operate, and provides a very good shooting results.

3) Calculating the bounding curve of the landmark shape under the generalized column coordinates and add the constraint to avoid the conflict between the local path and the landmark.

4) Use B-splines to connect the key-views corresponding to a single landmark, making the local path as smooth as possible.

5) Turning the problem of solving the transit path into an STSP problem. By constructing the global optimization of the STSP solver, the transit path and landmark visit order can be obtained effectively.

6) UI simple. Users do not need to edit the 3D path in complex 3D space, and basically do not need to set the parameters, just need to follow the given steps and get the corresponding result.

7) The path quality is excellent. In several different scenarios, it generates a global UAV path and users are very satisfied with the aerial video shoot in the real world.

Based on the same inventive concept as the UAV flight path generation method shown in FIG. 1, the embodiment of the present application further provides an UAV flight path generation device, as described in the following embodiments. Since the principle of the UAV flight path generator solves the problem is similar to the UAV flight path generation method, the implementation of the UAV flight path generator may refer to the implementation of the UAV flight path generation method.

Figure 20:
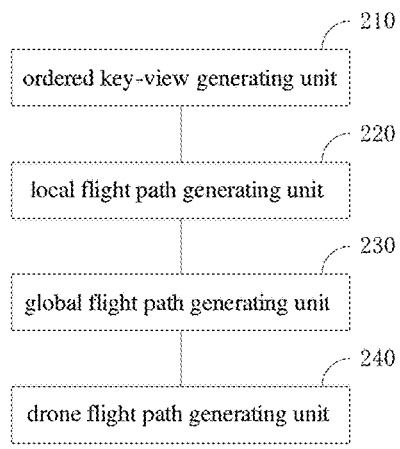
FIG. 20 is a schematic structural diagram of a UAV flight path generating device according to an embodiment of the present invention.

FIG. 20 is a schematic structural diagram of a UAV flight path generating device according to an embodiment of the present invention. As shown in FIG. 20, the UAV flight path generating apparatus of this embodiment may include an ordered key-view generating unit 210, a local flight path generating unit 220, a global flight path generating unit 230, and a drone flight path generating unit 240. The above units are connected in sequence.

ordered key-view generating unit 210: generates at least one ordered subset of key-views based on the key-views of the landmark in the scene.

local flight path generating unit 220: constructing smooth and local trajectories, and define the associated cost function based on the ordered key-views subset.

global flight path generating unit 230: turning the problem of finding transit trajectories into a STSP problem and define the associated cost function based on the local trajectories.

drone flight path generating unit 240: using for design the final cost function based on both local cost function and transit cost function, solving the system and get the final trajectories.

Figure 21:
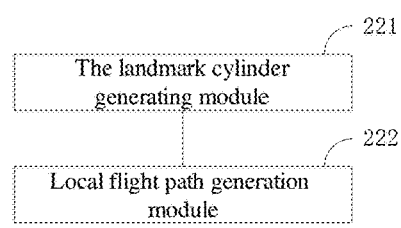
FIG. 21 is a schematic structural diagram of a local flight path generating part according to an embodiment of the present invention.

FIG. 21 is a schematic structural diagram of a local flight path generating part according to an embodiment of the present invention. As FIG. 21 illustrated, local trajectory generate module 220, include:

The landmark cylinder generating module 221 and the local flight path generating module 222, those modules are connected with each other.

The landmark cylinder generation module 221 is used to: create a cylinder surrounding the landmark in a generalized cylindrical coordinate system.

Local flight path generation module 222 is used to: Under the constrain of making sure the radius of the camera position in a cylinder coordinate is bigger than the landmark, using B-spline interpolation, connecting each key-view of a single landmark can make the local flight path as smooth as possible and prevent the local flight path from conflict with the landmark by interpolation.

Figure 22:
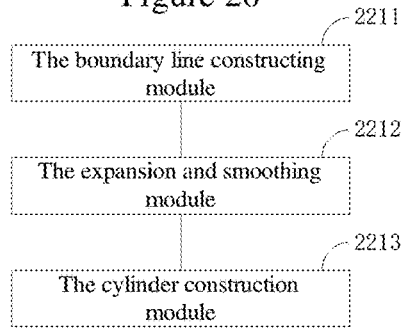
FIG. 22 is a schematic structural diagram of a landmark cylinder generating module in an embodiment of the present invention.

FIG. 22 is a schematic structural diagram of a landmark cylinder generating module in an embodiment of the present invention. As shown in FIG. 22, the landmark cylinder generating module 221 may include: a boundary line constructing module 2211, an expansion and smoothing module 2212, and a cylinder building module 2213, wherein the above modules are sequentially connected.

The boundary line constructing module 2211 is used to: establish a generalized cylindrical coordinate system with a landmark as a center and construct a boundary line of a ground-based landmark of a landmark under a plane polar coordinate of a generalized cylindrical coordinate system.

The expansion and smoothing module 2212 is used to: extend and smooth the boundary line, and generate a boundary curve of the ground projection of the landmark.

The cylinder construction module 2213 is used to: construct a landmark cylinder based on the boundary curve in a generalized cylindrical coordinate system.

Figure 23:
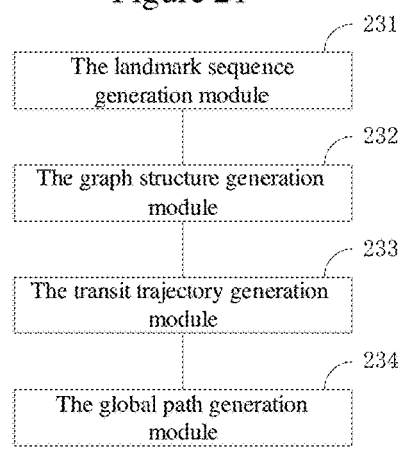
FIG. 23 is a schematic structural diagram of a global flight path generating part in an embodiment of the present invention.

FIG. 23 is a schematic structural diagram of a global flight path generating unit in an embodiment of the present invention. As shown in FIG. 23, the global flight path generating module 230 may include a landmark sequence generating module 231, a graph structure generating module 232, a transit trajectory generating module 233, and a global path generating module 234, and the above modules are sequentially connected.

The landmark sequence generation module 231 is used to generate various access sequences of at least one landmark in a scene.

The graph structure generation module 232 is used to generate two nodes with opposite directions corresponding to a landmark according to a local flight path and generate a graph structure located in a landmark outer space according to two nodes with opposite directions and access orders corresponding to the at least one landmark.

The transit trajectory generation module 233 is used to: solve a generalized traveling salesman problem based on a graph structure and obtain a shortest transit trajectory for accessing at least one landmark.

The global path generation module 234 is used to generate a global flight path by using the B-spline according to the shortest migration trajectory.

Figure 24:
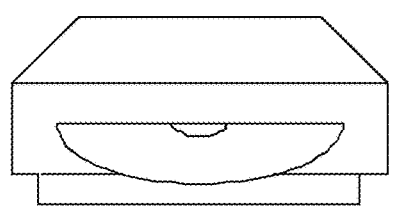
FIG. 24 is a schematic diagram of a computer-readable storage medium according to an embodiment of the present invention.

An embodiment of the present invention further provides a computer-readable storage medium, as shown in FIG. 24, having a computer program stored thereon, and the program is executed by a processor to implement the steps of the method in the foregoing embodiments.

Figure 25:
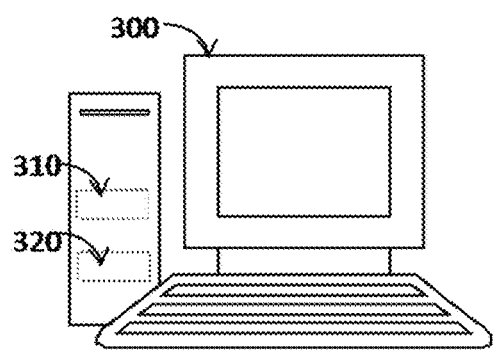
FIG. 25 is a schematic diagram of a computer device according to an embodiment of the present invention.

An embodiment of the present invention further provides a computer device. As shown in FIG. 25, the computer device 300 includes a memory 310, a processor 320, and a computer program stored on the memory 310 and executable on the processor 320. The processor 320 runs the steps of the method described in the foregoing embodiments when the program is executed.

To sum up, in the method, device, storage medium and device for generating a flight path of a UAV according to the embodiments of the present invention, the user may not be required to specify a sequence of critical views by generating a subset of possible ordered critical views according to the set of critical views. By constructing a generalized traveling salesman problem, multiple shortest global flight paths can be identified. By associating each local flight path with its cost function, a better local flight path can be determined. By associating each global flight path with its cost function, a better global flight path can be determined. Through the overall cost function, both the better local flight path and the better global flight path can be reconstructed to generate the optimal UAV flight path. As a result, users can easily choose interesting key perspectives for each of the landmarks, resulting in a complete, ordered sequence of key perspectives that can be used to achieve a satisfactory UAV flight path.

In the descriptions of the Specification, the terms "an (one) embodiment", "an (one) specific embodiment", "some embodiments", "for example (such as)", "example", "specific example", "some examples", etc. mean that the specific features, structures, materials or characteristics described with reference to the embodiment(s) or example(s) are included in at least one embodiment or example of the present invention. In the Specification, the schematic description of any of those terms does not certainly mean the same embodiment or example. In addition, the described specific features, structures, materials or characteristics may be combined in a proper way in any one or more embodiments or examples. The sequence of the steps concerned in each embodiment just schematically describe the implementation of the present invention, wherein the sequence of the steps is not limited and may be appropriately adjusted upon demand.

A person skilled in the art shall appreciate that any embodiment of the present invention can be provided as a method, a system or a computer program product. Therefore, the present invention can take the form of a full hardware embodiment, a full software embodiment, or an embodiment combining software and hardware. Moreover, the present invention can take the form of a computer program product implemented on one or more computer usable storage mediums (including, but not limited to, a magnetic disc memory, CD-ROM, optical storage, etc.) containing therein computer usable program codes.

The present invention is described with reference to a flow diagram and/or block diagram of the method, device (system) and computer program product according to the embodiments of the present invention. It shall be understood that each flow and/or block in the flow diagram and/or block diagram and combinations thereof can be realized by the computer program instructions. These computer program instructions can be provided to a general computer, a dedicated computer, an embedded processor or a processor of other programmable data processing device to generate a machine, such that the instructions performed by the computer or the processor of other programmable data processing devices generate the device for implementing the function designated in one flow or a plurality of flows in the flow diagram and/or a block or a plurality of blocks in the block diagram.

These computer program instructions can also be stored in a computer readable memory capable of directing the computer or other programmable data processing devices to operate in a specific manner, such that the instructions stored in the computer readable memory generate a manufactured article including an instruction device that implements the function(s) designated in one flow or a plurality of flows in the flow diagram and/or a block or a plurality of blocks in the block diagram.

These computer program instructions can also be loaded onto a computer or other programmable data processing devices, such that a series of operation steps is executed on the computer or other programmable devices to generate the processing realized by the computer, therefore the instructions executed on the computer or other programmable devices provide the steps for implementing the function designated in one flow or a plurality of flows in the flow chart and/or a block or a plurality of blocks in the block diagram.

The above specific embodiments further describe the objectives, the technical solutions and the advantageous effects of the present invention in details. It shall be understood that those described are just specific embodiments of the present invention, rather than limitations to the protection scope of the present invention. Any amendment, equivalent replacement, improvement, etc. made within the spirit and principle of the present invention shall fall within the protection scope of the present invention.

The invention claimed is:

1. A UAV flight path generating method, comprising:
   generating at least one ordered key-view subset based on the key-views of the landmark in the scene;
   generating local flight paths according to the ordered key-view subset, and defining the local cost function of the local flight paths;
   constructing a generalized traveling salesman problem (STSP) based on the local flight paths, getting at least one global flight path to visit at least one landmark by solving the STSP problem, and defining the global cost function of the global flight path;
   generating the final cost function based on both the local cost function and the global cost function, and generating the flight path of the UAV by selecting a local flight path and a global flight path according to the result of the solution.

2. The UAV flight path generating method according to claim 1, wherein generating local flight paths according to the ordered key-view subset, comprises:
   building a generalized cylinder surface surrounding these landmarks in cylindrical coordinates;
   under the constraint with that the polar radius of key-views location in the generalized cylindrical coordinate system is larger than the polar radius of the cylinder, connecting the positions of the key-views in the ordered key-view subset using a B-Spline interpolation method, and generating the local flight path of the landmark.

3. The UAV flight path generating method according to claim 2, wherein building a generalized cylinder surface surrounding these landmarks in cylindrical coordinates, comprises:
   building a generalized cylindrical coordinate system with landmark as center, and constructing the boundary curve of landmarks under the plane polar coordinates of generalized cylindrical coordinate system;
   extending and smoothing the boundary curve, and generating the bounding curve of the landmarks on the ground projection;
   building the cylinder surface based on the bounding curve in the generalized cylindrical coordinate system.

4. The UAV flight path generating method according to claim 1, wherein constructing a generalized traveling salesman problem (STSP) based on the local flight paths, getting at least one global flight path to visit at least one landmark by solving the STSP problem, comprises:
   generating all kinds of different visit order of at least one landmark;
   generating two nodes with opposite directions corresponding to the landmark according to the local flight path, and generating the graph structure located outside the landmark space according to the two nodes with opposite directions and the access sequence corresponding to at least one landmark;
   based on the graph structure, solving the STSP problem, and obtaining the shortest migration trajectory to visit at least one landmark;
   according to the shortest migration trajectory, generating the global flight path using a B-spline.

5. The UAV flight path generating method according to claim 1, wherein before generating at least one ordered key-view subset based on the key-views of the landmark in the scene, the method further comprises:
   selecting at least one key-view of one landmark in the scene for generating a set of key-views, wherein at least one key-view includes mandatory key-views and/or the optional ones.

6. The UAV flight path generating method according to claim 1, wherein before constructing a generalized traveling salesman problem (STSP) based on the local flight paths, getting at least one global flight path to visit at least one landmark by solving the STSP problem, the method further comprises:
   determining a set number of local flight paths with the lowest cost by solving the local cost function of each local flight path of the landmark, so as to construct a STSP problem.

7. The UAV flight path generating method according to claim 1, wherein both the local cost function of the local flight path and the global cost function of the global flight path are related to curvature, viewport direction and the length of path.

8. A computer readable storage medium comprising computer readable instructions, wherein the computer readable instructions enable, when being executed, a processor to at least perform the operations of:
   generating at least one ordered key-view subset based on the key-views of the landmark in the scene;
   generating local flight paths according to the ordered key-view subset, and defining the local cost function of the local flight paths;
   constructing a generalized traveling salesman problem (STSP) based on the local flight paths, getting at least one global flight path to visit at least one landmark by solving the STSP problem, and defining the global cost function of the global flight path;
   generating the final cost function based on both the local cost function and the global cost function, and generating the flight path of the UAV by selecting a local flight path and a global flight path according to the result of the solution.

9. The computer readable storage medium according to claim 8, wherein when performing the step of generating local flight paths according to the ordered key-view subset, the instructions enable the processor to perform the operations of:
   building a generalized cylinder surface surrounding these landmarks in cylindrical coordinates;
   under the constraint with that the polar radius of key-views location in the generalized cylindrical coordinate system is larger than the polar radius of the cylinder, connecting the positions of the key-views in the ordered key-view subset using a B-Spline interpolation method, and generating the local flight path of the landmark.

10. The computer readable storage medium according to claim 9, wherein when performing the step of building a generalized cylinder surface surrounding these landmarks in cylindrical coordinates, the instructions enable the processor to perform the operations of:
   building a generalized cylindrical coordinate system with landmark as center, and constructing the boundary curve of landmarks under the plane polar coordinates of generalized cylindrical coordinate system;
   extending and smoothing the boundary curve, and generating the bounding curve of the landmarks on the ground projection;
   building the cylinder surface based on the bounding curve in the generalized cylindrical coordinate system.

11. The computer readable storage medium according to claim 8, wherein when performing the step of constructing a generalized traveling salesman problem (STSP) based on the local flight paths, getting at least one global flight path to visit at least one landmark by solving the STSP problem, the instructions enable the processor to perform the operations of:
   generating all kinds of different visit orders of at least one landmark;
   generating two nodes with opposite directions corresponding to the landmark according to the local flight path, and generating the graph structure located outside the landmark space according to the two nodes with opposite directions and the access sequence corresponding to at least one landmark;
   based on the graph structure, solving the STSP problem, and obtaining the shortest migration trajectory to visit at least one landmark;
   according to the shortest migration trajectory, generating the global flight path using a B-spline.

12. The computer readable storage medium according to claim 8, wherein before performing the step of generating at least one ordered key-view subset based on the key-views of the landmark in the scene, the instructions further enable the processor to perform the operations of:
   selecting at least one key-view of one landmark in the scene for generating a set of key-views, wherein at least one key-view includes mandatory key-views and/or the optional ones.

13. The computer readable storage medium according to claim 8, wherein before performing the step of constructing a generalized traveling salesman problem (STSP) based on the local flight paths, getting at least one global flight path to visit at least one landmark by solving the STSP problem, the instructions further enable the processor to perform the operations of:
   determining a set number of local flight paths with the lowest cost by solving the local cost function of each local flight path of the landmark, so as to construct a STSP problem.

14. The computer readable storage medium according to claim 8, wherein both the local cost function of the local flight path and the global cost function of the global flight path are related to curvature, viewport direction and the length of path.

15. An computer device, comprising:
   a memory comprising computer readable instructions; and
   a processor configured to, when the computer readable instructions are executed, perform the operations of:
   generating at least one ordered key-view subset based on the key-views of the landmark in the scene;
   generating local flight paths according to the ordered key-view subset, and defining the local cost function of the local flight paths;
   constructing a generalized traveling salesman problem (STSP) based on the local flight paths, getting at least one global flight path to visit at least one landmark by solving the STSP problem, and defining the global cost function of the global flight path;
   generating the final cost function based on both the local cost function and the global cost function, and generating the flight path of the UAV by selecting a local flight path and a global flight path according to the result of the solution.

16. The computer device according to claim 15, wherein when performing the step of generating local flight paths according to the ordered key-view subset, the instructions enable the processor to perform the operations of:
   building a generalized cylinder surface surrounding these landmarks in cylindrical coordinates;
   under the constraint with that the polar radius of key-views location in the generalized cylindrical coordinate system is larger than the polar radius of the cylinder, connecting the positions of the key-views in the ordered key-view subset using a B-Spline interpolation method, and generating the local flight path of the landmark.

17. The computer device according to claim 16, wherein when performing the step of building a generalized cylinder surface surrounding these landmarks in cylindrical coordinates, the instructions enable the processor to perform the operations of:
   building a generalized cylindrical coordinate system with landmark as center, and constructing the boundary curve of landmarks under the plane polar coordinates of generalized cylindrical coordinate system;
   extending and smoothing the boundary curve, and generating the bounding curve of the landmarks on the ground projection;
   building the cylinder surface based on the bounding curve in the generalized cylindrical coordinate system.

18. The computer device according to claim 15, wherein when performing the step of constructing a generalized traveling salesman problem (STSP) based on the local flight paths, getting at least one global flight path to visit at least one landmark by solving the STSP problem, the instructions enable the processor to perform the operations of:
   generating all kinds of different visit orders of at least one landmark;
   generating two nodes with opposite directions corresponding to the landmark according to the local flight path, and generating the graph structure located outside the landmark space according to the two nodes with opposite directions and the access sequence corresponding to at least one landmark;
   based on the graph structure, solving the STSP problem, and obtaining the shortest migration trajectory to visit at least one landmark;
   according to the shortest migration trajectory, generating the global flight path using a B-spline.

19. The computer device according to claim 15, wherein before performing the step of generating at least one ordered key-view subset based on the key-views of the landmark in the scene, the instructions further enable the processor to perform the operations of:
   selecting at least one key-view of one landmark in the scene for generating a set of key-views, wherein at least one key-view includes mandatory key-views and/or the optional ones.

20. The computer device according to claim 15, wherein before performing the step of constructing a generalized traveling salesman problem (STSP) based on the local flight paths, getting at least one global flight path to visit at least one landmark by solving the STSP problem, the instructions further enable the processor to perform the operations of:
   determining a set number of local flight paths with the lowest cost by solving the local cost function of each local flight path of the landmark, so as to construct a STSP problem.

21. The computer device according to claim 15, wherein both the local cost function of the local flight path and the global cost function of the global flight path are related to curvature, viewport direction and the length of path.

* * * * *